United States Patent
Wachigai et al.

(10) Patent No.: US 7,334,556 B2
(45) Date of Patent: Feb. 26, 2008

(54) ENGINE CONFIGURATION FOR A MOTORCYCLE

(75) Inventors: Kaoru Wachigai, Saitama (JP); Yoshiyuki Sekiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 11/235,348

(22) Filed: Sep. 26, 2005

(65) Prior Publication Data
US 2006/0065458 A1 Mar. 30, 2006

(30) Foreign Application Priority Data
Sep. 29, 2004 (JP) ............................ 2004-284990
Sep. 29, 2004 (JP) ............................ 2004-284991

(51) Int. Cl.
*F02F 7/00* (2006.01)
*F02B 75/22* (2006.01)
*F01M 1/02* (2006.01)

(52) U.S. Cl. ..................... 123/195 HC; 123/195 R; 123/196 R; 184/6.5; 184/6.8; 180/219; 180/312

(58) Field of Classification Search ............ 123/195 R, 123/195 HC, 196 R; 184/6.5, 6.8, 6.1; 180/312
See application file for complete search history.

(56) References Cited

U.S. PATENT DOCUMENTS

| | | | | |
|---|---|---|---|---|
| 4,901,813 A | * | 2/1990 | Kimura et al. | 180/230 |
| 6,073,719 A | * | 6/2000 | Ohmika et al. | 180/219 |
| 6,276,481 B1 | * | 8/2001 | Matsuto et al. | 180/220 |
| 6,349,785 B1 | * | 2/2002 | Ohmika et al. | 180/227 |
| 6,405,821 B2 | * | 6/2002 | Tsutsumikoshi | 180/226 |
| 6,513,613 B2 | * | 2/2003 | Suzuki et al. | 180/227 |
| 6,557,516 B2 | * | 5/2003 | Tsutsumikoshi | 123/196 R |
| 6,986,400 B2 | * | 1/2006 | Osada | 180/228 |
| 7,013,860 B2 | * | 3/2006 | Takeuchi | 123/196 R |

FOREIGN PATENT DOCUMENTS

| | | |
|---|---|---|
| JP | 07-063034 | 3/1995 |
| JP | 2003-182667 | 7/2003 |

* cited by examiner

*Primary Examiner*—Stephen K. Cronin
(74) *Attorney, Agent, or Firm*—Carrier, Blackman & Associates, P.C.; Joseph P. Carrier; William D. Blackman

(57) ABSTRACT

A motorcycle is provided in which a seat and a storage box are arranged so as to be vertically stacked on each other in a rear portion of a body frame, and a pivotally mounted powertrain unit is suspended from the body frame under the storage box. The powertrain unit extends in the fore-and-aft direction of the body frame, and the engine has a crank chamber and a lubricant oil chamber provided separately from each other. A lubrication-oil passage structure for the engine is provided between each of a pair of journal bearing portions of a crankcase. The crankcase has an enclosed crank chamber and a crankshaft which is freely rotatably supported by the journal bearing portions with plain bearings. The journal bearing portions are provided with protrusion bosses for resisting entry of lubricating oil into the crank chamber from outside of the crankcase.

18 Claims, 11 Drawing Sheets

ENGINE CONFIGURATION FOR A MOTORCYCLE

CROSS-REFERENCE TO RELATED APPLICATIONS

The present invention claims priority under 35 USC 119 based on Japanese Patent Application No. 2004-284990, filed on Sep. 29, 2004, and Japanese Patent Application No. 2004-284991, also filed on Sep. 29, 2004. The entire disclosures of Japanese Patent Application No. 2004-284990 and Japanese Patent Application No. 2004-284991 including the specifications, claims, drawings and summaries thereof are incorporated herein by reference in their entirety.

BACKGROUND OF THE INVENTION

1. Field of the Invention

The present invention relates to motorcycles. More particularly, the present invention relates to a motorcycle that suspends a pivotally mounted powertrain unit from a rear portion of a body frame, and includes a storage box above the powertrain unit, and further includes a lubrication-oil passage structure for an engine provided with an enclosed crank chamber.

2. Description of the Background Art

Heretofore, a motorcycle has been proposed in which a seat and a storage box are arranged so as to be vertically stacked on each other in a rear portion of a body frame. In addition, a pivotally mounted powertrain unit is suspended from the body frame under the storage box. An engine of the powertrain unit is constructed so that an engine body, a transmission and a rear wheel extend in the fore-and-aft direction of the body frame. An example of such a motorcycle is disclosed in Japanese Patent Laid-Open No. 2003-182667.

In addition, it is known to provide a motorcycle having an engine provided with dry-sump lubrication means that is also provided with an enclosed crank chamber. An example of a motorcycle having this configuration is disclosed in Japanese Patent Laid-Open No. H07-63034.

In Japanese Patent Laid-Open No. 2003-182667, in which a motorcycle is provided with the storage box positioned above the pivotally mounted powertrain unit, when the storage box is extended upward in order to increase a capacity of the storage box, the ground clearance of the seat, which is mounted above the storage box, is increased. As a result, it becomes difficult for a passenger to get on and off the motorcycle. Meanwhile, when the powertrain unit itself is disposed at a lower position in order to increase the capacity of the storage box, the minimum ground clearance of the powertrain unit is reduced. Moreover, when a position of a crankshaft of the engine is lowered downward in order to reduce the overall height of the powertrain unit, an amount of lubricating oil agitated by the crankshaft is increased, resulting in an increase in agitation resistance of the lubricating oil. Further, when it is attempted to restrict the agitation resistance, it is necessary to reduce a volume of the lubricating oil. In any case, a decrease of engine performance occurs.

In an engine in which a crankshaft is freely rotatably supported by journal bearing portions in the crankcase with plain bearings such as metal bearings, in order to achieve further downscaling of the engine, and furthermore, in order to achieve further downscaling of the crankcase, and cost cutting thereof, the engine is configured to forcedly feed lubricating oil to the supporting portion.

However, in such an engine, the lubricating oil passes through between the journal bearing portion and the crankshaft and enters the enclosed crank chamber, the stored oil quantity in the chamber increases, and resistance to agitation by rotation of the crankshaft therefore increases.

The present invention has been created in consideration of such circumstances. A first object of the present invention is to provide a novel motorcycle, in which an improvement is added to a powertrain unit, thereby being adapted to solve the above-described problems, and to make it possible to increase a capacity of a storage box.

A second object of the present invention is to provide a novel lubrication-oil passage structure for an engine, which prevents the lubricating oil from entering the enclosed crank chamber to the extent possible and is thus made capable of solving the above problem.

Still other objects and advantages of the invention will in part be obvious and will in part be apparent from the specification.

SUMMARY OF THE INVENTION

In order to achieve the first object, a first aspect of the invention of is directed to a motorcycle constructed by providing a seat and a storage box that are vertically stacked on each other in a rear portion of a body frame. The motorcycle also includes a pivotally mounted powertrain unit suspended from the body frame under the storage box. The invention is characterized in that the powertrain unit includes an engine in which a cylinder axial line is disposed to be oriented in a fore-and-aft direction of the body frame. A rear wheel is coupled to a rear of the engine by means of a transmission. Thus, the powertrain unit extends in the fore-and-aft direction of the body frame. Moreover, the engine has a crank chamber and a lubricant oil chamber provided separately from each other.

A second aspect of the invention is characterized in that the lubricant oil chamber is provided along a side of the crank chamber and below the crank chamber.

A third aspect of the invention is characterized in that the powertrain unit is suspended from the body frame by means of a coupling link for pivotally coupling an upper portion of the engine to the body frame, and the coupling link is disposed under the storage box.

In order to achieve the second object of the invention, a motorcycle is constructed by providing a seat and a storage box that are vertically stacked on each other in a rear portion of a body frame. The motorcycle also includes a pivotally mounted powertrain unit suspended from the body frame under the storage box. In this motorcycle, a fourth aspect of the invention is directed to a lubrication-oil passage structure for an engine disposed between each of a pair of journal bearing portions which are formed in a crankcase. The crankcase has an enclosed crank chamber, and a crankshaft which is freely rotatably supported by the journal bearing portions with plain bearings. The pair of journal bearing portions is provided with lubrication-oil entrance barriers for preventing lubricating oil from entering the crank chamber from outside of the crankcase.

A fifth aspect of the invention includes the lubrication-oil passage structure for an engine of the fourth aspect, wherein the lubrication-oil entrance barrier is formed by a protrusion boss extending from the journal bearing portion toward the crankshaft. An end face of the protrusion boss is positioned closely adjacent to an outer face of the crankshaft and is thus configured to block an oil leakage gap between the crankshaft and the journal bearing portion.

A sixth aspect of the invention includes the lubrication-oil passage structure for an engine of the fourth or fifth aspect, wherein the lubrication-oil entrance barrier includes a communicating oil passage provided within the journal bearing portion. The communicating oil passage permits the inside and outside of the crank chamber to communicate with each other, wherein the communicating oil passage is configured to immediately return the lubricating oil which has lubricated between the journal bearing portion and the crankshaft to outside of the crank chamber.

A seventh aspect of the invention includes the lubrication-oil passage structure for an engine in any one of the fourth aspect to sixth aspect, wherein at least one of the pair of journal bearing portions is provided with an oil seal. The oil seal seals between one journal bearing portion and the crankshaft on a side opposite to the crank chamber across a plain bearing. In addition, at least one of the pair of journal bearing portions is provided with a returning oil passage for returning the lubricating oil, blocked by the oil seal, to a lubricating oil chamber, wherein the communicating oil passage is allowed to communicate with the returning oil passage.

According to the first aspect of the invention, the powertrain unit includes the engine in which the cylinder axial line is disposed to be oriented in the fore-and-aft direction of the body frame. In addition, the rear wheel is coupled to the rear of the engine by means of the transmission, and the powertrain unit extends in the fore-and-aft direction of the body frame. Accordingly, height of the powertrain unit can be shortened to a great extent. Moreover, the engine is configured such that the crank chamber and the lubricant oil chamber are provided separately from each other. Accordingly, downsizing of the crankcase is achieved, and in addition, a degree of freedom in position where the lubricant oil chamber is provided is increased. In such a way, the overall height of the engine, and in particular, of the crankcase thereof can be restricted, and can be made to be small. Hence, the capacity of the storage box provided above the engine is increased, and in addition, the seat height can be lowered. In addition, the engine can ensure a sufficient volume of the lubricating oil while restricting agitation resistance of the lubricating oil by the crankshaft. As a result, performance of the powertrain unit is not degraded even if the overall height thereof is reduced.

According to the second aspect of the invention, in addition to first aspect of the invention, the lubricant oil chamber is provided along the side of the crank chamber and under the crank chamber. Accordingly, agitation of the lubricating oil is restricted while making it possible to lower the crankshaft downward. Furthermore, a distance between the crank chamber and the lubricant oil chamber is shortened, and oil passage construction can be thus simplified. As a result, a load on a hydraulic pump can be reduced. In addition, a specified amount of the lubricating oil can be ensured.

According to the third aspect of the invention, in addition to the first and second aspects of the invention, the coupling link for suspending the powertrain unit from the body frame can increase the capacity of the storage box, while ensuring a length of the storage box and improving cushion performance thereof.

Furthermore, according to the fourth aspect of the invention, in addition to the first aspect of the invention, since it is possible to minimize the entrance of the lubricating oil into the enclosed crank chamber, it is also possible to minimize the agitation of the lubricating oil by the crankshaft. Thus, engine performance is improved.

According to the fifth aspect of the invention, in addition to the fourth aspect of the invention, since the lubrication-oil entrance barrier is formed by the protrusion boss extending from the journal-bearing portion toward the crankshaft, the structure thereof is simple, and machining the structure into the journal-bearing portion is easy.

According to the sixth aspect of the invention, in addition to the fourth or fifth aspect of the invention, the communicating oil passages provided to the journal bearing portion assist in the prevention of entrance of the lubricating oil into the crankcase, and machining of the passages is easy.

According to the seventh aspect of the invention, in addition to the fourth, fifth, or sixth aspect of the invention, since the returning oil passage for returning the lubricating oil blocked by the oil seal to the lubricating oil chamber is also used as an oil passage for returning the lubricating oil from the communicating oil passage to the lubricating oil chamber, simplification of the construction of the oil passage is achieved.

The features of the present invention believed to be novel and the elements characteristic of the present invention are set forth with particularity in the appended claims. The Figures are for illustration purposes only and are not drawn to scale. The invention itself, however, both as to-organization and method of operation, may best be understood by reference to the detailed description which follows taken in conjunction with the accompanying drawings in which:

DETAILED DESCRIPTION OF THE PREFERRED EMBODIMENTS

Figure 1:
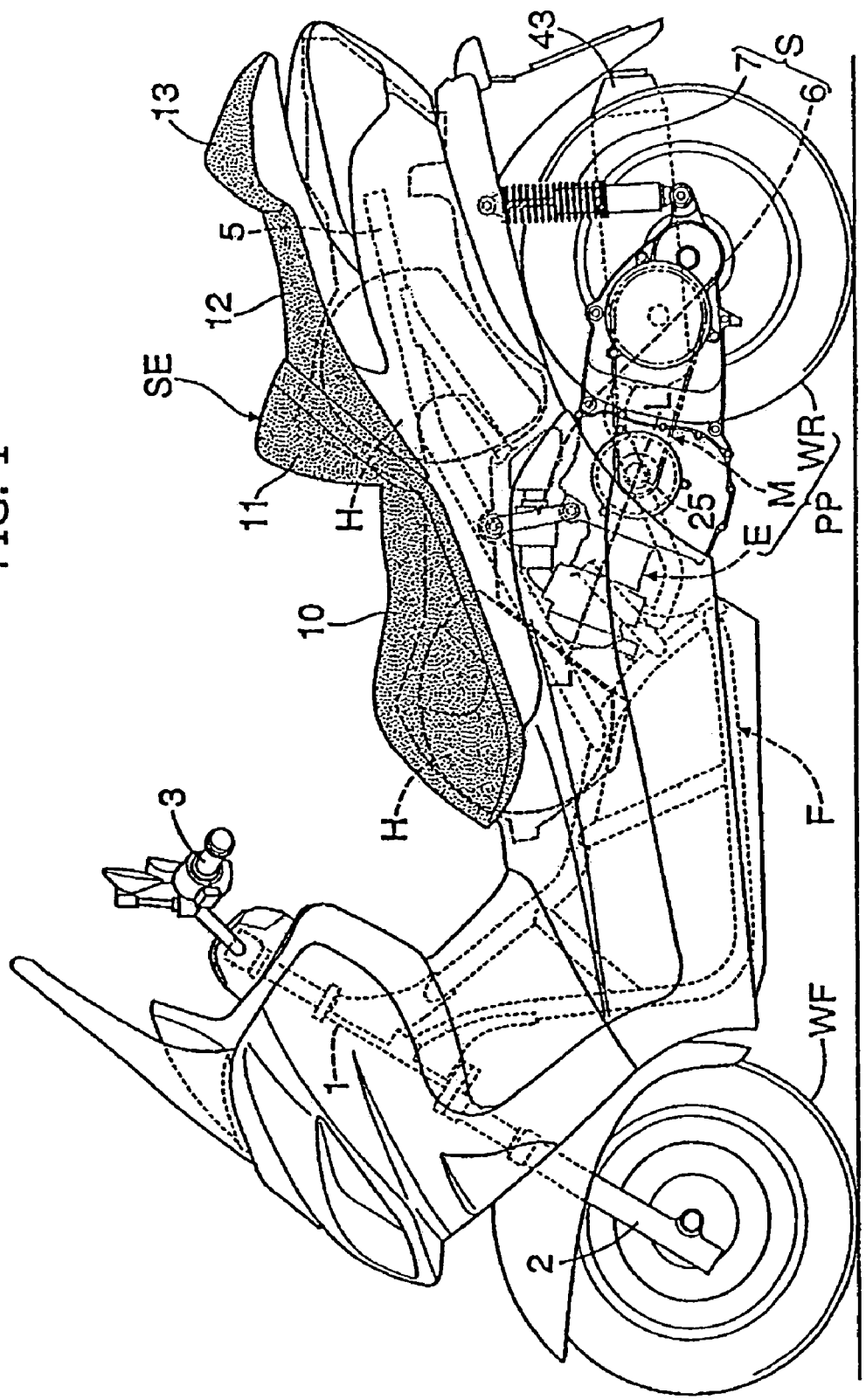
FIG. 1 is a side plan view of a motorcycle provided with an engine having a lubrication-oil passage structure therein in accordance with a selected illustrative embodiment of the present invention, showing the engine residing below a storage box situated below the seat of the motorcycle.

In describing the preferred embodiment of the present invention, reference will be made herein to FIGS. 1 to 11 of the drawings in which like numerals refer to like features of the invention. Features of the invention are not necessarily shown to scale in the drawings. Note that, in the following description, relative positional terms such as "front", "rear", "left" and "right" are described from the vantage point of a driver seated on the motorcycle and facing forward.

Referring now to FIGS. 1 to 11, embodiments of a motorcycle in accordance with the present invention will be explained below. The embodiments of the present invention include not only a motorcycle, but also a lubrication-oil passage structure implemented in an engine for a motorcycle.

Figure 2:
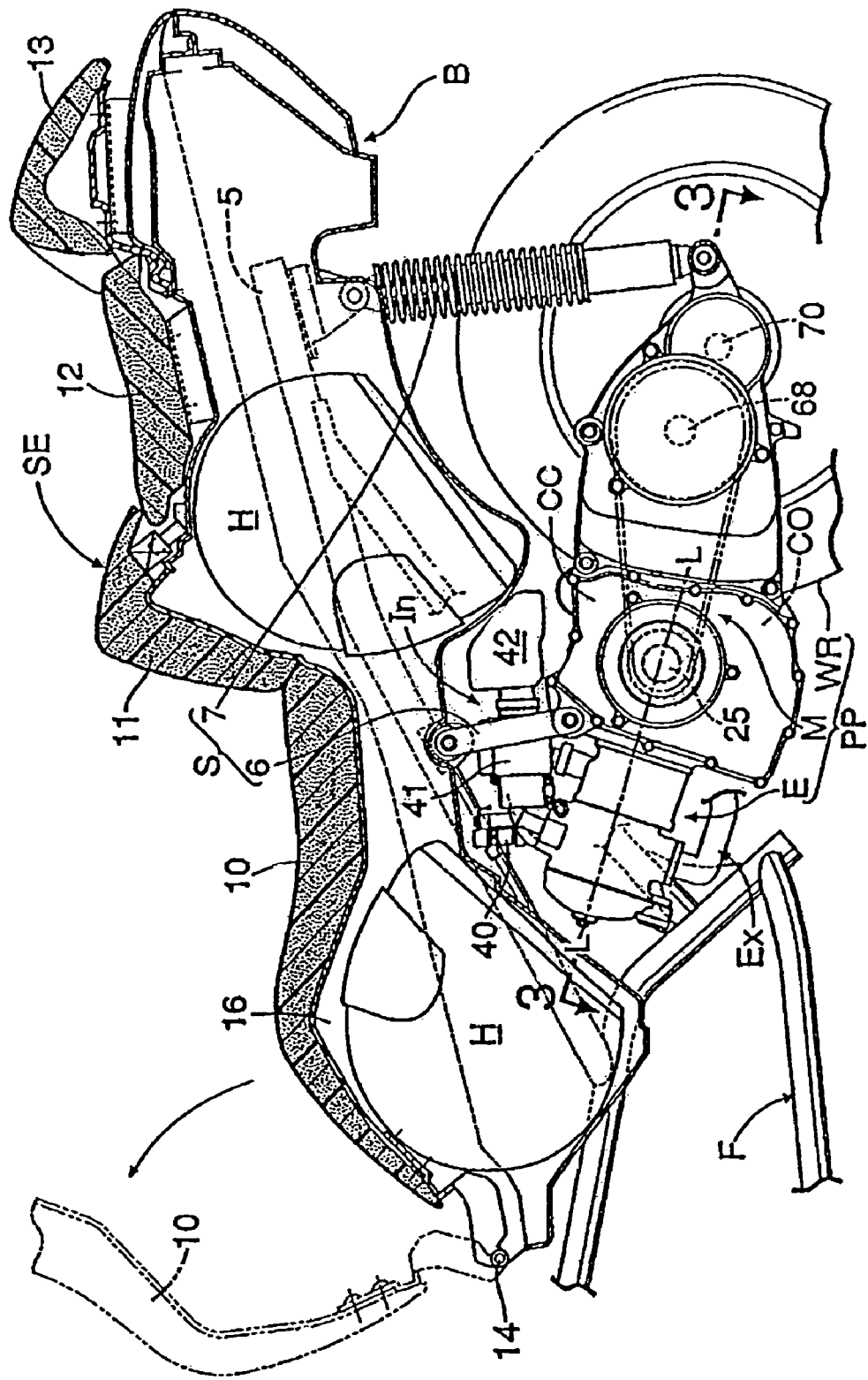
FIG. 2 is a longitudinal cross-sectional view of a rear portion of the motorcycle of FIG. 1, showing a powertrain unit, including the engine and transmission, extending substantially horizontally in the for-and-aft direction of the body frame.

In FIGS. 1 and 2, in a scooter-type motorcycle, a front fork 2 for pivotally supporting a front wheel WF is steerably supported on a head pipe 1 at a front end of a body frame F of the motorcycle, and a steering handlebar 3 is provided on an upper portion of the front fork 2. Moreover, on a rear portion of the body frame F, a pivotally mounted powertrain unit PP is supported by means of a suspension S, so as to be able to swing reciprocally in a vertical direction, within a limited range of movement. The above-described pivotally mounted powertrain unit PP includes an engine E disposed in the fore-and-aft direction with respect to the body frame F, and a transmission M extending from the engine E toward the rear of the motorcycle. The motorcycle also includes a rear wheel WR rotatably supported on a rear portion of the transmission M.

The suspension S includes a coupling link 6 and a rear shock absorber 7. With regard to the coupling link 6, upper and lower ends thereof are pivotally supported on the body frame F and a hanger portion of an upper front portion of the powertrain unit PP, respectively. This configuration permits the coupling link 6 to swing in the fore-and-aft direction. Moreover, with regard to the rear shock absorber 7, upper and lower ends thereof are, respectively, coupled to the body frame F and to a rear portion of the powertrain unit PP. Hence, the pivotally mounted powertrain unit PP is suspended from the body frame F so as to be able to swing vertically by means of the suspension S composed of the coupling link 6 and the rear shock absorber 7.

In the depicted embodiment, the engine E of the powertrain unit PP is a four-cycle, single-cylinder, four-valve, water-cooled and fuel-injection engine, and includes a cylinder arranged along a cylinder axial line L-L, which extends substantially horizontally (somewhat inclined up in front) in the fore-and-aft direction of the body frame F. Moreover, the transmission M of the powertrain unit PP includes a generally conventional V-belt driven continuously variable transmission, for continuously shifting an output of the engine E by means of a drive V belt and a cone pulley, and transmitting the output to the rear wheel WR.

As shown in FIG. 2, a tandem seat SE is mounted on a seat rail 5 of the rear portion of the body frame F. The tandem seat SE is composed by longitudinally arranging a front seat 10 and a rear seat 12 in the fore and aft direction of the vehicle. The front seat 10 has a backrest 11 provided in a rear portion thereof, and the rear seat 12 has a backrest 13 provided in a rear portion thereof. Moreover, with regard to the front seat 10, a front end thereof is connected by means of a hinge coupling 14 to the body frame F so as to be able to open in the vertical direction, and permits opening and closing of an entrance 16 of a storage box B. Immediately under the tandem seat SE, on the body frame F, the storage box B is supported integrally therewith. The storage box B has substantially the same fore-and-aft length as that of the tandem seat SE. Under the storage box B, the above-described pivotally mounted powertrain unit PP is disposed. The storage box B is formed to be long in the fore-and-aft direction, and as shown in FIG. 2, is capable of housing two full-face helmets H in series.

Next, construction of the above-described pivotally mounted powertrain unit PP will be described in detail referring mainly to FIG. 3 to FIG. 11. The powertrain unit PP is elongate in the fore-and-aft direction of the body frame F. As shown in FIGS. 3 to 6, an engine block 20 of the engine E, as part of a drive unit of the powertrain unit PP, includes a cylinder block 22 having a single cylinder bore 21, and a cylinder head 23 joined to a front surface (deck surface) thereof. The engine block 20 extends substantially horizontally in the fore-and-aft direction of the body frame F. Moreover, a crankcase 24, in which a crankshaft 25 is supported so as to be freely rotatable, is joined to a rear surface (opposite surface to the cylinder head 23) of the engine block 20. The cylinder block 20, the cylinder head 23 and the crankcase 24 are joined integrally with one another by means of plural through bolts 36 (see FIG. 4).

A piston 26 is fitted into the cylinder bore 21 of the cylinder block 22 so as to be able to freely slide. A crank pin portion 25p of the crankshaft 25 is continuously joined to the piston 26 with a connecting rod 27. In the respective pairs of intake ports 28 and exhaust ports 29, both of which open to a combustion chamber of the cylinder head 23, a pair of intake valves 30 and a pair of exhaust valves 31 are provided, respectively, so as to be able to open and close. These valves 30 and 31 are conventionally operated to open and close at predetermined times by a valve mechanism 33, which is provided in the cylinder head 23. An ignition plug 44 is provided in the combustion chamber of the cylinder head 23. A head cover 35 for covering the valve mechanism 33 is fixedly attached onto an outer surface of the cylinder head 23. A valve camshaft 32 of the valve mechanism 33 is interlocked with the crankshaft 25 through a timing drive mechanism 34, and rotationally driven in a reduction ratio of 2:1.

Figure 5:
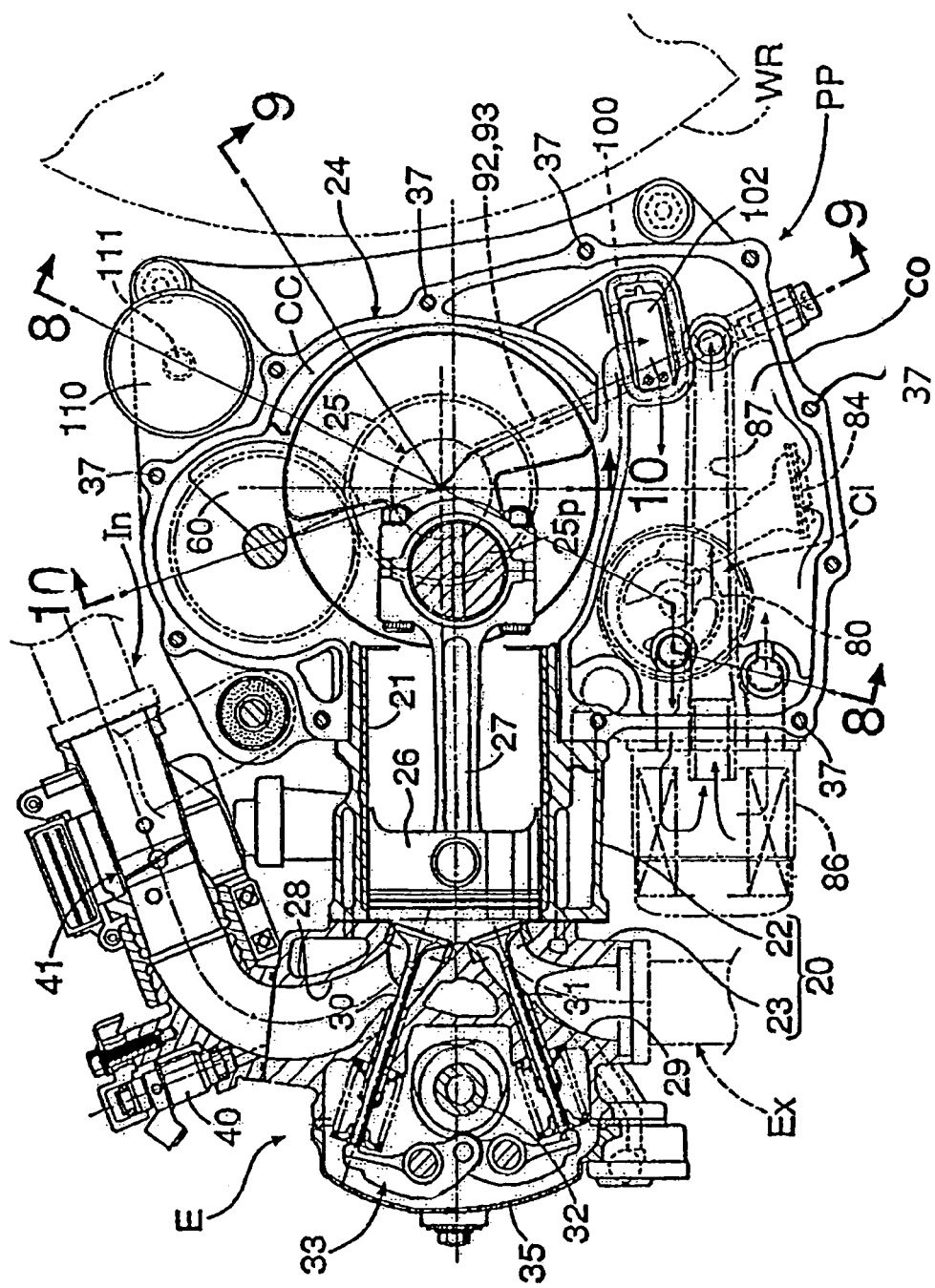
FIG. 5 is a cross-sectional view of the engine, taken along a line 5-5 in FIG. 4.
Figure 6:
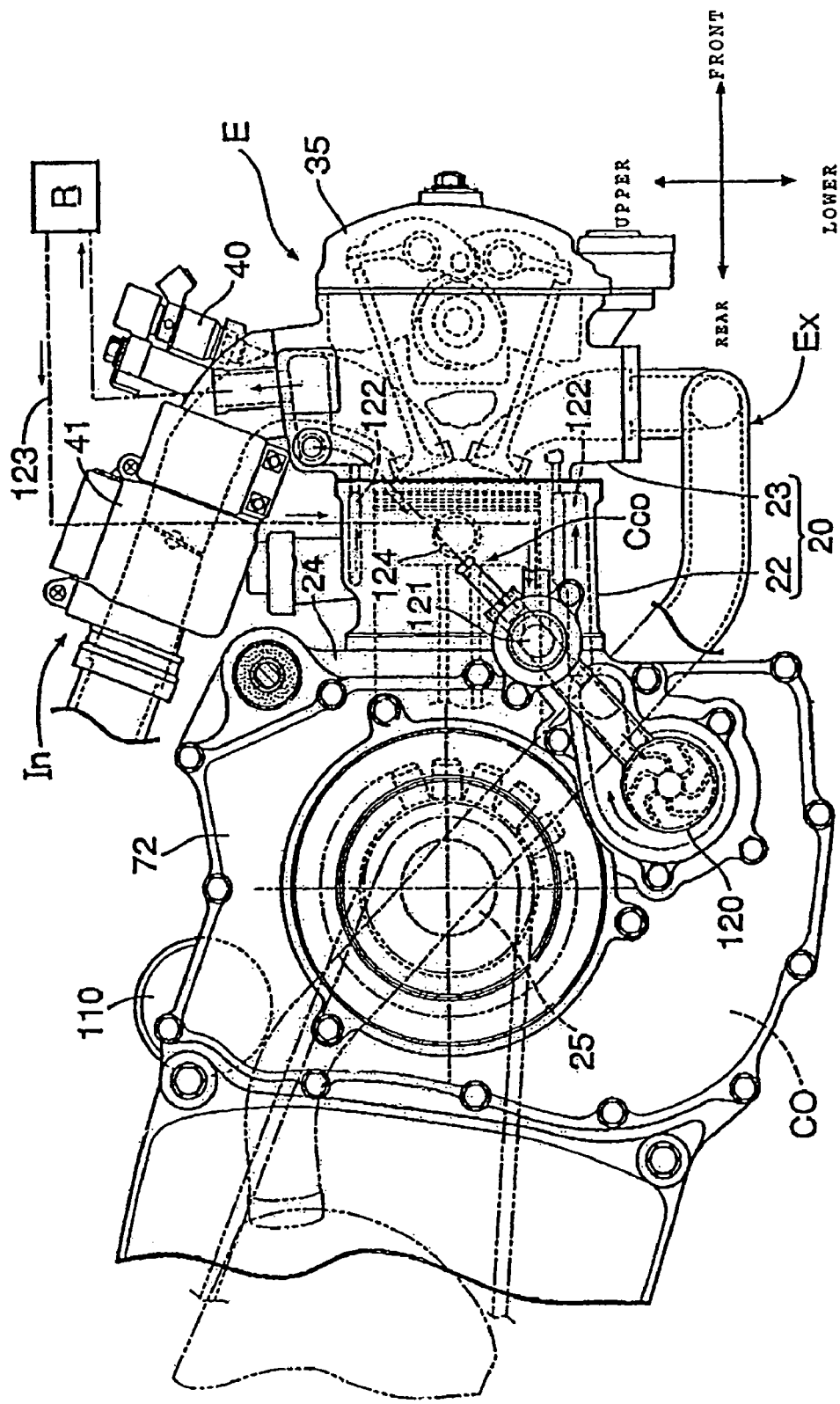
FIG. 6 is a right side plan view of the engine as seen in the direction of an arrow 6 in FIG. 4, showing the configuration of the intake and exhaust systems of the engine.

As shown in FIGS. 2 and 5, an intake system In is connected to the intake ports 28 formed in an upper portion of the cylinder head 23. The intake system In includes a fuel injection valve 40 and a throttle body 41 in a downstream portion thereof, and extends toward the rear above the engine E. An air cleaner 42 is connected to an upstream end thereof. Moreover, as shown in FIGS. 2 and 6, an exhaust system Ex is connected to the exhaust ports 29 formed in a lower portion of the cylinder head 23. The exhaust system Ex extends toward the rear below the engine E. An exhaust muffler 43 (see FIG. 1) is connected to a downstream end thereof.

Figure 3:
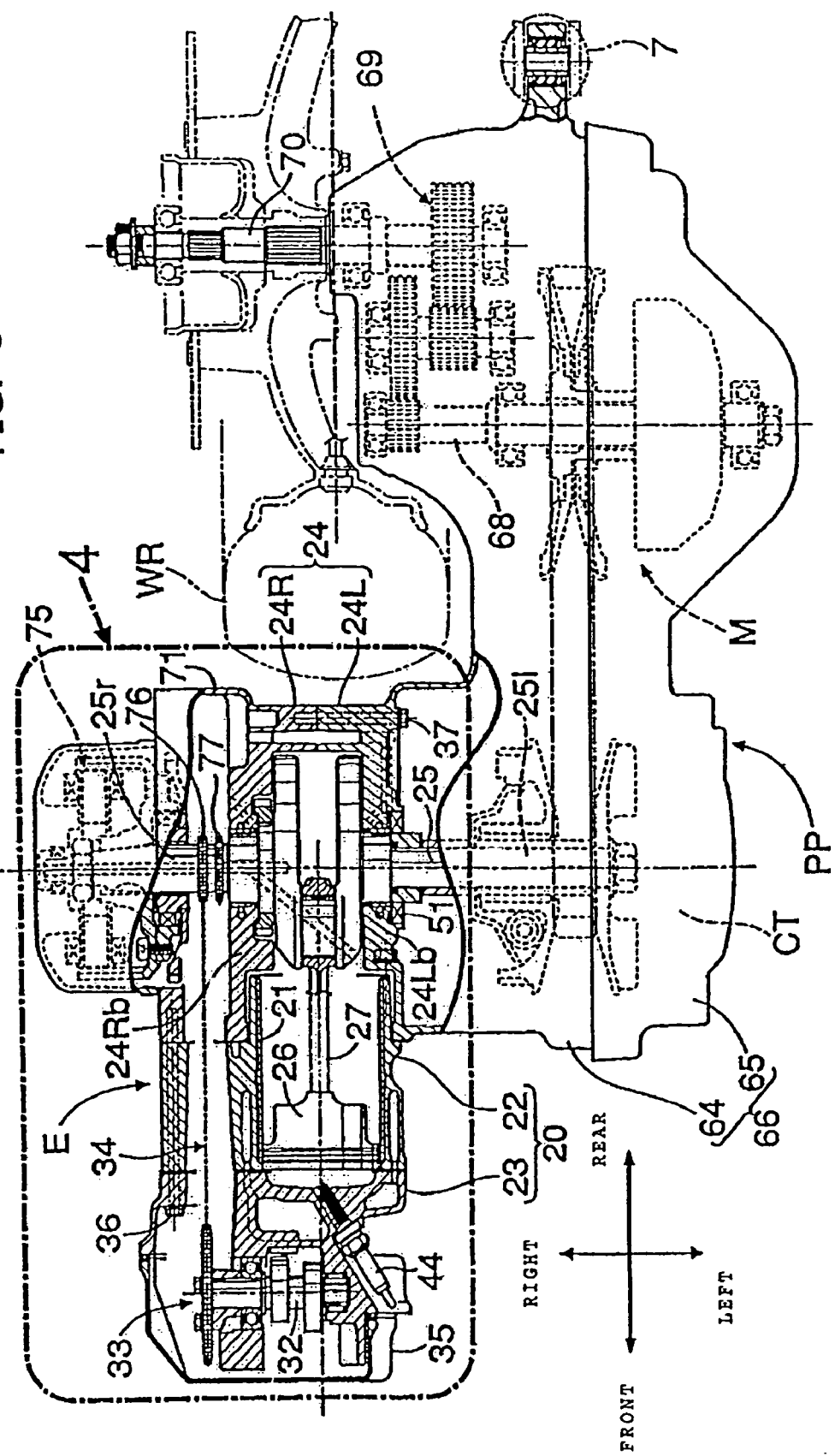
FIG. 3 is a cross-sectional view of the powertrain unit of FIG. 2, taken along a line 3-3 therein, and showing a drive case fixed to a side of the crankcase.
Figure 4:
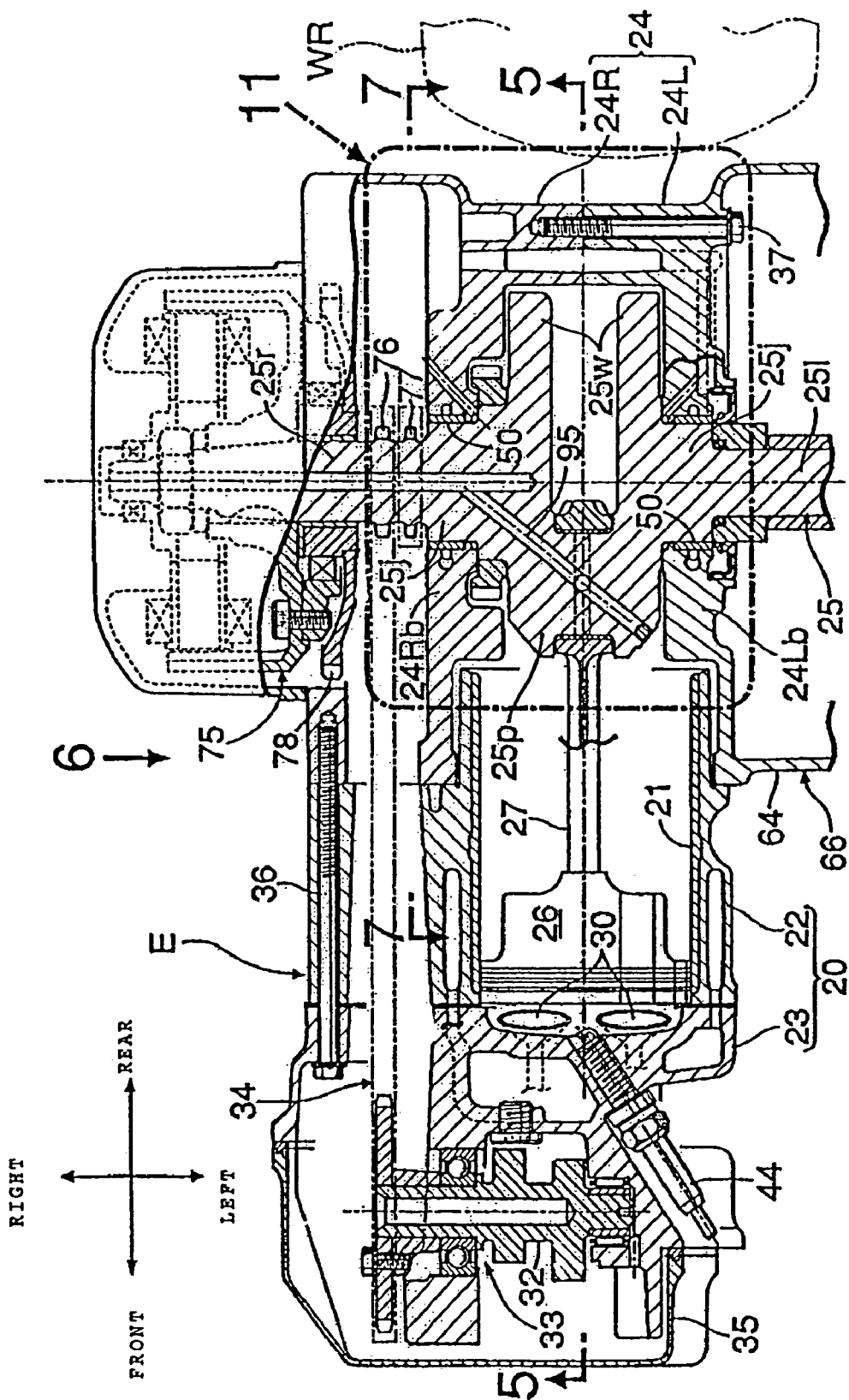
FIG. 4 is an enlarged detail view of a portion of the powertrain unit surrounded by a virtual line in FIG. 3 showing the detail of the crankcase.
Figure 11:
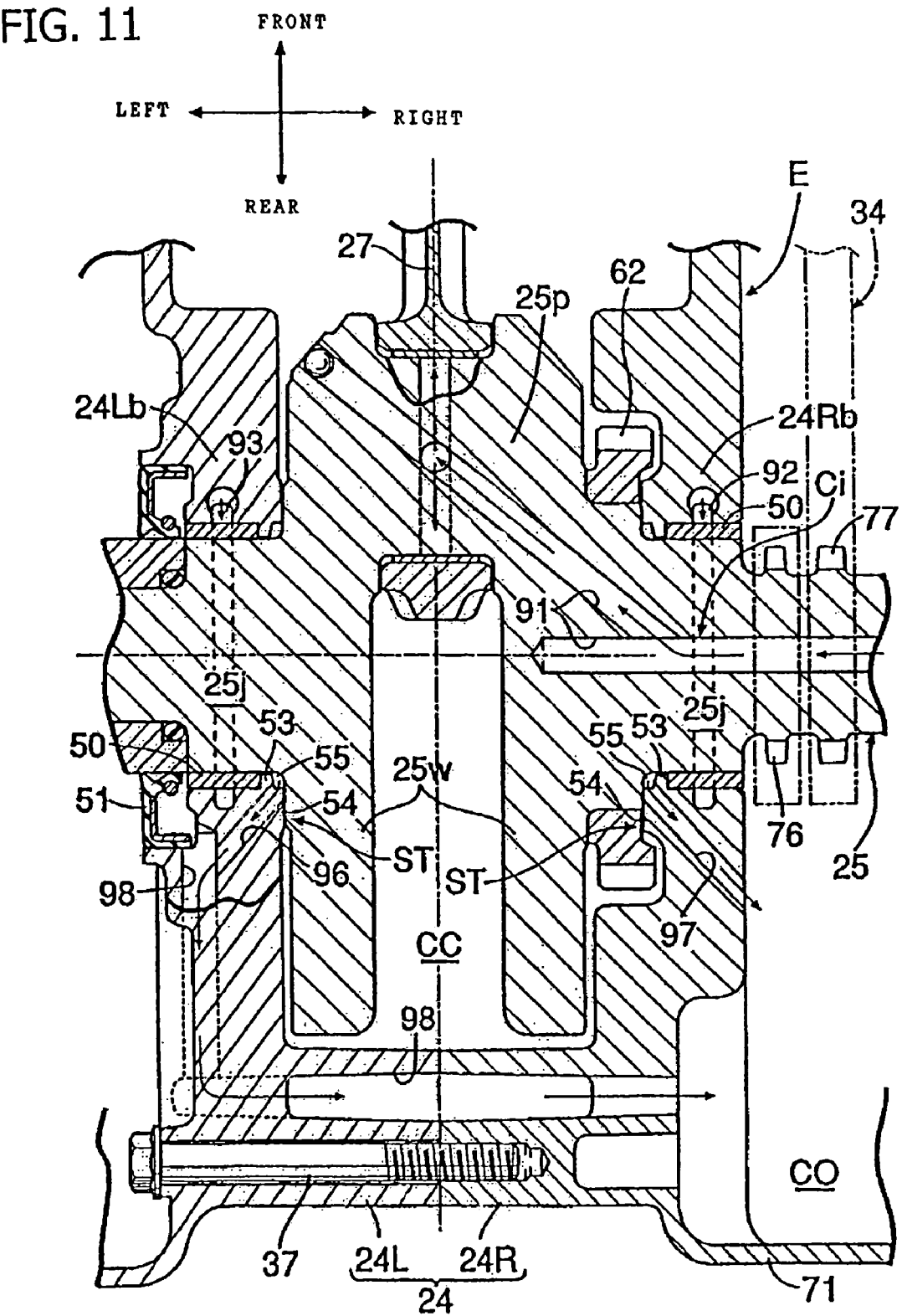
FIG. 11 is an enlarged view of the crank chamber surrounded by a virtual line and referenced by an arrow 11 in FIG. 4, showing the first and second protrusion bosses extending from the journal bearing portions toward the crankshaft.

As shown in FIGS. 3, 4 and 11, the crankcase 24 is formed of a left case half 24L on the left side of the body frame F and a right case half 24R on the right side of the body frame F so as to be divided in the vehicle width direction. Plural coupling bolts 37 couple these left and right case halves 24L and 24R integrally with each other. The left and right case halves 24L and 24R of the crankcase 24 have left and right side walls parallel to each other. On these left and right side walls, left and right journal bearing portions 24Lb and 24Rb are formed integrally therewith. On these left and right journal bearing portions 24Lb and 24Rb, the crankshaft 25 is disposed substantially horizontally across the body frame F in the width direction of the vehicle and is supported so as to be freely rotatable with plain bearings 50 and 50.

As shown in FIGS. 3, 4, 8 and 9, a hermetically sealed crank chamber CC defined by the crankcase 24 does not include an oil pan, and is formed to be relatively small in capacity. The crank chamber CC is comprised of a gap formed between the crank pin portion 25$p$ and crank web portions 25$w$ and 25$w$ of the crankshaft 25. The crank chamber CC, housed inside thereof, is made as small as possible.

Figure 10:
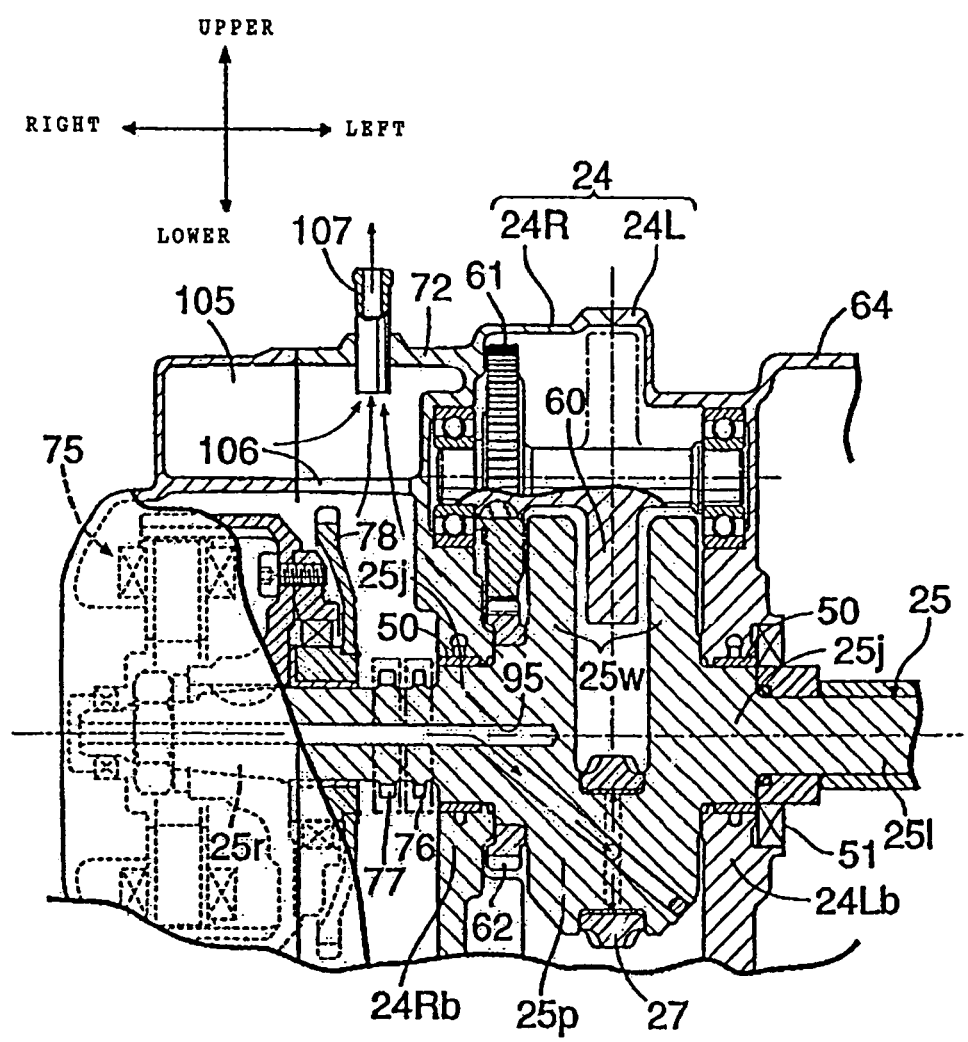
FIG. 10 is a cross-sectional view of the engine, taken along a line 10-10 in FIG. 5 and showing a breather chamber formed in an upper portion of the crankcase permitting respiration of the lubricant oil chamber.

As shown in FIGS. 5 and 10, on one side of an upper portion in the crank chamber CC, a balancer 60 is supported so as to be freely rotatable. The balancer 60 is driven in a reverse direction to the rotation of the crankshaft 25 in a rotation ratio of 1:1 through a driven gear 61 integral therewith and a drive gear 62 fixed to the crankshaft 25. The balancer 60 is adapted to cancel vibrations of the single-cylinder engine E.

As shown in FIG. 3, on an outside of the left case half 24L of the crankcase 24, a drive case body 64 is formed integrally therewith. Further, a drive case cover 65 is fixed to an open outside surface of the drive case body 64. A drive case 66 is formed of the drive case body 64 and the drive case cover 65. A drive chamber CT is defined by the drive case 66. The drive case 66 extends toward the rear of the body frame F; and the above-described V-belt continuously variable transmission M is housed in the drive chamber CT. A left shaft end 25$l$ of the crankshaft 25 is coupled to an input side of the continuously variable transmission M. The left shaft end 25$l$ is formed by extending the left journal bearing portion 24Lb into the drive case 66 through an oil seal 51. The continuously variable transmission M extends toward the rear of the vehicle within the drive chamber CT. A countershaft 68, supported in the drive case 66 so as to be freely rotatable, is coupled to an output side thereof. The countershaft 68 is interlocked with a rear axle 70 suspended from a rear portion of the drive case 66 so as to be freely rotatable through a reduction gear group 69 provided in the rear portion of the drive case 66. On an outer end of the rear axle 70, the rear wheel WR is supported integrally therewith.

Note that the above-described V-belt continuously variable transmission M is one (detailed description thereof is omitted) conventionally known in public, and is adapted to be capable of continuously shifting the rotation of the crankshaft 25 and transmitting the rotation to the rear wheel WR.

Figure 9:
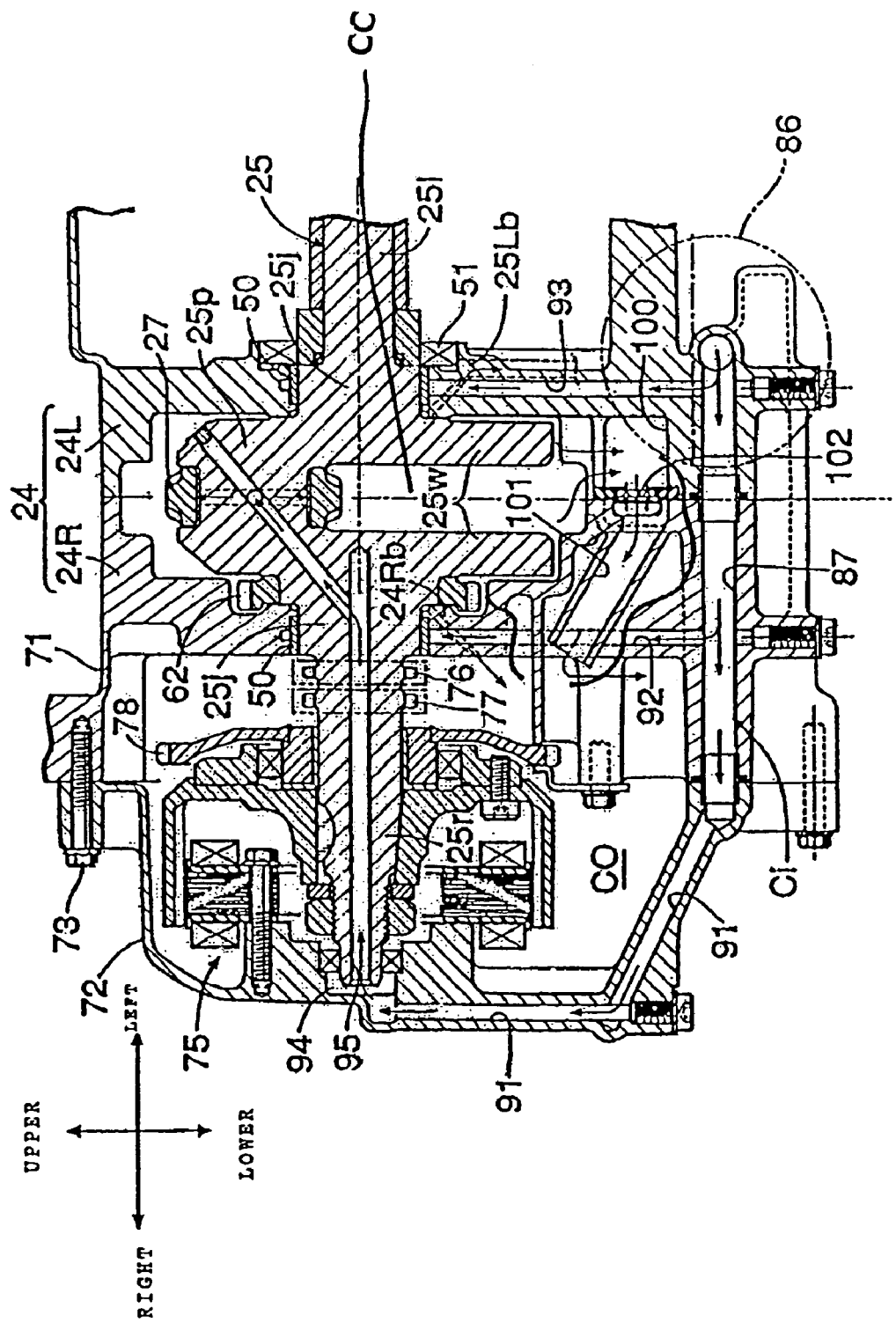
FIG. 9 is a cross-sectional view of the engine, taken along a line 9-9 in FIG. 5 and showing a small capacity reservoir formed in a lower portion of the sealed crank chamber.

As shown in FIG. 9, on the right case half 24R of the crankcase 24, an extended wall portion 71 extends in a crankshaft direction and is formed integrally with the right case half 24R. Plural bolts 73 fix the crankcase cover 72 onto an outside surface of the extended wall portion 71. Moreover, adjacent to the crank chamber CC, a hermetically sealed lubricant oil chamber CO is disposed under the crank chamber CC and along a side thereof. The lubricant oil chamber CO is formed of the right case half 24R and the crankcase cover 72. In an upper portion of the lubricant oil chamber CO, a fly-wheel magneto 75 is housed. A right shaft end 25$r$ of the crankshaft 25 is coupled to the fly-wheel magneto 75. The right shaft end 25$r$ of the crankshaft 25 penetrates the journal bearing portion 24Rb of the right case half 24R and extends into the lubricant oil chamber CO. The fly-wheel magneto 75 is driven by the crankshaft 25.

The lubricant oil chamber CO extends from the side of the crankcase 24 to the wall of the crankcase cover 72. In the lubricant oil chamber CO, two drive sprockets 76 and 77 and a starter gear 78 are fixed to the crankshaft 25. The above-described timing drive mechanism 34 provided in the engine block 20 is coupled to one of the sprockets, which is denoted by reference numeral 76. An oil pump (feed pump) 80 and a water pump 120, which will be described later, are coupled to the other drive sprocket 77. Moreover, a starter motor 110 is coupled to the starter gear 78.

In the above-described engine E, dry sump lubrication means is provided. A description will be given below of the construction of the lubrication means.

The dry sump lubrication means includes the oil pump (feed pump) 80, and a reed valve 102 which is opened and closed by pressure variations generated in the hermetically sealed crank chamber CC by an operation of the engine E. The dry sump lubrication means is adapted to suck lubricating oil in the lubricant oil chamber CO and supply the lubricating oil to the respective lubricated portions of the crankshaft 25 by means of the oil pump 80, and to return the lubricating oil collected in the crank chamber CC to the lubricant oil chamber CO by opening the reed valve 102. A specific structure of the dry sump lubrication means will be described below with reference to FIGS. 5 to 9.

The lubricating oil is accumulated in the lower portion of the hermetically sealed lubricant oil chamber CO described above. In the lubricant oil chamber CO, the oil pump 80 (see FIG. 8) is provided on the lower portion of the right case half 24R of the crankcase 24. A driven sprocket 82, fixed to a pump shaft 81 of the oil pump 80, is interlocked with the above-described drive sprocket 76 through an endless drive chain 83. Since the drive sprocket 76 is integral with the crankshaft 25, the driven sprocket 82 is driven by the crankshaft 25. A suction side of the oil pump 80 is made to communicate with an oil strainer 84 immersed in the lubricating oil of the lubricant oil chamber CO. The lubricating oil of the oil pump 80 is adapted to be supplied to the lubricated portions of the crankshaft 25 and the like through an oil circuit Ci. Specifically, a discharge oil passage 85 continuous with a discharge side of the oil pump communicates with an oil filter 86 (see FIG. 7) provided on one end of the lower portion of the crankcase 24, and an outlet of the oil filter 86 communicates with a main gallery 87 formed in the crankcase 24.

As shown in FIG. 9, the main gallery 87 is made to communicate with first, second and third branch oil passages 91, 92 and 93 formed in the crankcase cover 72 and the crankcase 24. Clean lubricating oil from the oil filter 86 is supplied from the first branch oil passage 91 to the crank pin portion 25$p$ through an oil reservoir 94 facing to one end of the crankshaft 25 and a crank oil passage 95 formed in the crankshaft 25. Moreover, the clean lubricating oil is supplied from the second and third branch oil passages 92 and 93 to journal shaft portions 25$j$ and 25$j$ of the crankshaft 25, respectively.

A lubricating oil barrier ST for inhibiting the lubricating oil from entering the hermetically sealed crank chamber CC is provided between the crankcase 24 and the crankshaft 25.

A structure of the lubricating oil barrier ST will be described below referring mainly to FIGS. 4 and 11. On the left and right journal bearing portions 24Lb and 24Rb of the crankcase 24, the journal shaft portions 25$j$ and 25$j$ of the crankshaft 25 are supported so as to be freely rotatable with the plain bearings 50 and 50. The oil seal 51 is provided adjacent to the plain bearing 50 on an opposite side (drive chamber CT side) relative to the crank chamber CC in the left journal bearing portion 24Lb. The oil seal 51 seals a space between the crankshaft 25 and the left journal bearing portion 24Lb.

On corner portions in the left and right journal bearing portions 24Lb and 24Rb on the crank chamber CC side, an annular first convex portion 53 and an annular second convex portion 54 are individually formed integrally therewith. The annular first convex portion 53 is adjacent to the plain bearing 50 and protrudes in the diameter direction toward the journal shaft portion 25j of the crankshaft 25, and the annular second convex portion 54 protrudes in the axial direction toward the crank web portions 25w of the crankshaft 25. Inner peripheral surfaces of the first and second convex portions 53 and 54 are made to abut on outer peripheral surfaces of the journal shaft portions 25j of the crankshaft 25 and on outside surfaces of the crank web portions 25w thereof, respectively. Moreover, an annular gap 55 is formed between the corner portions of the journal shaft portions 25j and the first and second convex portions 53 and 54. Furthermore, the first and second convex portions 53 and 54 abut on the crankshaft 25, and the lubricating oil is thus inhibited from entering the crank chamber CC.

Note that the above-described gap 55 carries out a labyrinth packing function in cooperation with the first and second convex portions 53 and 54, thus making it possible to prevent the entrance of the lubricating oil into the above-described crank chamber CC. Moreover, the second convex portion 54 abuts on the outside surfaces of the crank web portions 25w, thus making it possible to serve also as a thrust receiver of the crankshaft 25. With regard to the first and second protrusion bosses 53 and 54, even if only one of them is used, it is possible to prevent the lubricating oil from entering the crank chamber CC.

Moreover, as shown in FIG. 11, left and right communication oil passages 96 and 97 are formed in the left and right journal bearing portions 24Lb and 24Rb of the crankcase 24, respectively. An inside end of the left communication oil passage 96 opens into the crank chamber CC through the above-described gap 55, and an outside end thereof communicates with the lubricant oil chamber CO through a return oil passage 98 formed in the left case half 24L. Meanwhile, an inside end of the right communication oil passage 97 opens into the crank chamber CC through the gap 55, and an outside end thereof directly communicates with the lubricant oil chamber CO. Then, the lubricating oil that has lubricated between the crankshaft 25 and the left and right journal bearing portions 24Lb and 24Rb is rapidly returned to the lubricant oil chamber CO through these left and right communication oil passages 96 and 97.

The return oil passage 98 described above communicates with an outer peripheral portion of the above-described oil seal 5 1, and the oil sealed by the oil seal 51 is returned to the lubricant oil chamber CO through the return oil passage 98. A hydraulic regulator 88 (see FIG. 8) is connected to the oil circuit Ci, and when a hydraulic pressure in the oil circuit Ci exceeds a predetermined pressure, the oil circuit Ci is short-circuited to the lubricant oil chamber CO through the hydraulic regulator 88.

As shown in FIG. 9, a small-capacity oil reservoir 100 is formed in a lower portion of the hermetically sealed crank chamber, and the lubricating oil that has lubricated the respective lubricated portions of the crankshaft 25 is accumulated in the oil reservoir 100. A return oil passage 101 for returning the lubricating oil in the oil reservoir 100 to the above-described lubricant oil chamber CO is formed on a bottom wall of the crankcase 24. In the return oil passage 101, the reed valve 102, opened and closed by the pressure variations in the crank chamber CC, is provided. The return oil passage 110 is inclined toward the lubricant oil chamber CO, and an outlet thereof is opened to the lubricant oil chamber CO. Hence, when the pressure variations are generated in the hermetically sealed crank chamber CC by the operation of the engine E, the reed valve 102 is opened intermittently, thus making it possible to return the lubricating oil in the oil reservoir 100 to the lubricant oil chamber CO through the return oil passage 101.

Figure 7:
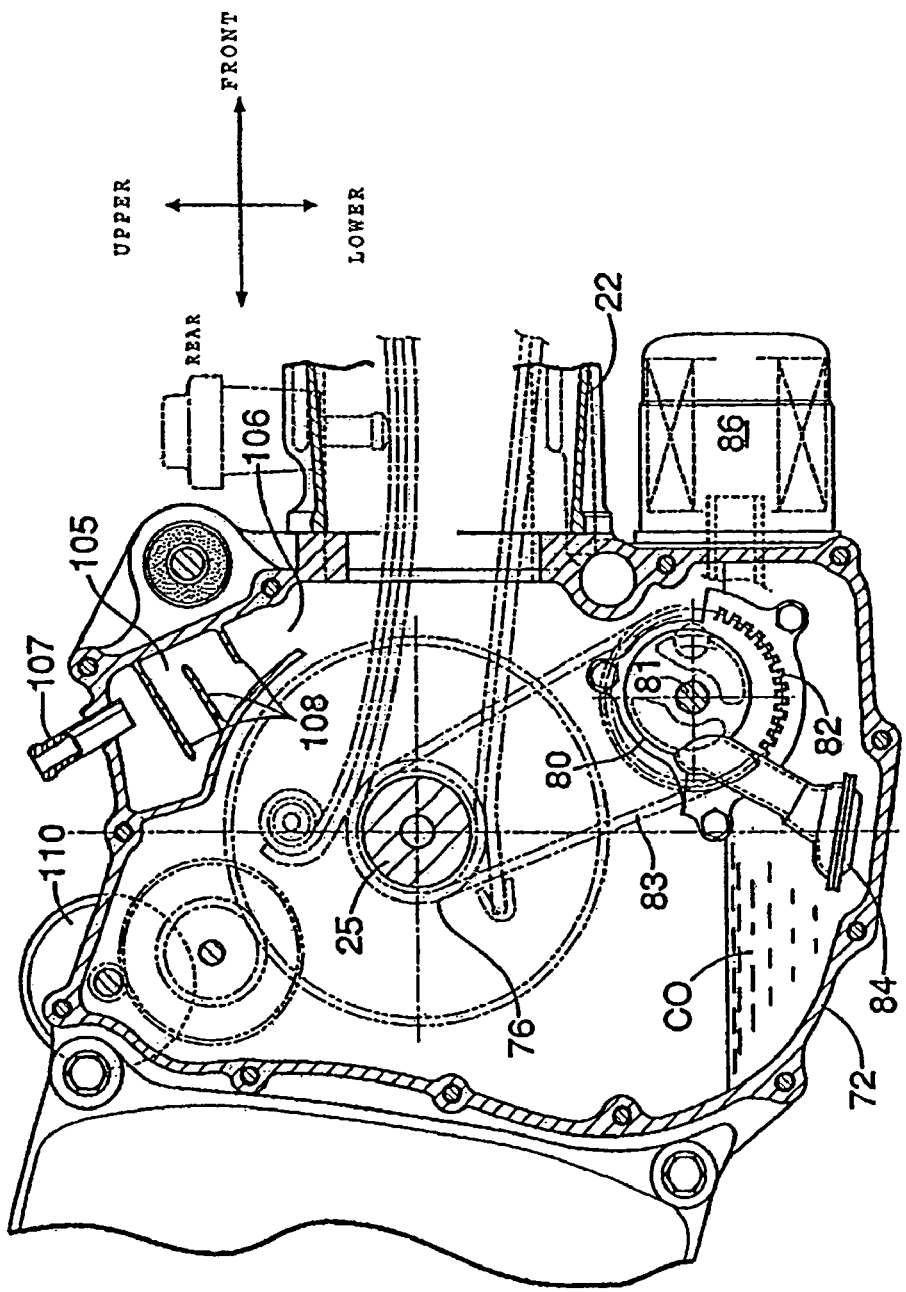
FIG. 7 is a cross-sectional view of the engine, taken along a line 7-7 in FIG. 4 and showing a breather chamber formed in an upper portion of the crankcase permitting respiration of the lubricant oil chamber.

As shown in FIGS. 7 and 10, on one side of upper portions in the right case half 24R and the crankcase cover 72, a breather chamber 105 is formed. The breather chamber 105 communicates with the lubricant oil chamber CO through a communication port 106 in a lower portion thereof. An upper portion of the breather chamber 105 opens to the atmosphere through a breather pipe 107. A respiration function is provided for the inside of the lubricant oil chamber CO through the breather chamber 105. Moreover, the inside of the breather chamber 105 is formed into a labyrinth by plural baffle boards 108 arranged in a zigzag manner, and oil mist mixed into the air is separated there, and returned to the lubricant oil chamber CO.

Figure 8:
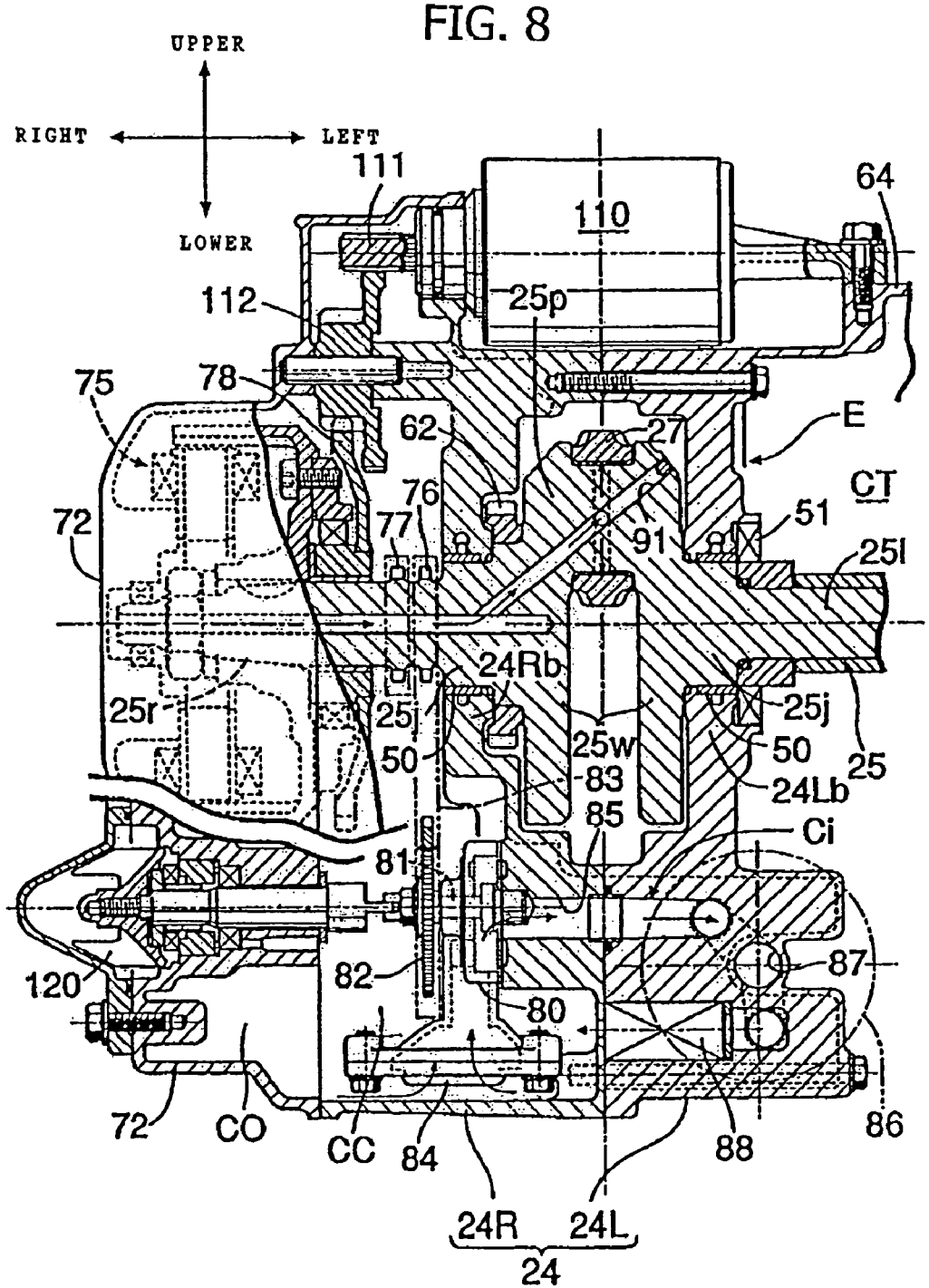
FIG. 8 is a cross-sectional view of the engine, taken along a line 8-8 in FIG. 5 and showing a water pump coaxial with the oil pump.

As shown in FIGS. 5 and 8, above the crankcase 24, the starter motor 110 is supported in a cross-linked manner therewith in parallel to the above-described balancer 60. A motor shaft 111 of the starter motor 110 is interlocked with the above-described starter gear 78 through an idler 112 supported on the crankcase 24.

The engine E is water-cooled in a conventional manner.

As shown in FIGS. 6 and 8, on one side of the crankcase cover 72, the water pump 120 is provided. The water pump 120 is coaxial with the above-described oil pump 80, and is driven by the crankshaft 25 together with the oil pump 80. A cooling circuit Cco continuous with the water pump 120 includes a main cooling circuit 123 connected to a radiator R with a thermostat 121 through a water jacket 122 in the engine block 20, and a bypass circuit 124 short-circuited to the water jacket 122 in the engine block 20 with the thermostat 121. During a hot start of the engine E, a coolant flows through the main cooling circuit 123 by an open of the thermostat 121, and during a cold start of the engine E, the coolant flows through the bypass circuit 124 by a close of the thermostat 121.

Note that, since the cooling means employed herein is well known, a detailed description thereof will be omitted.

Thus, addressing the first object of the invention, as described above, the powertrain unit PP includes the engine E in which the cylinder axial line L-L of the engine E is disposed to be oriented in the fore-and-aft direction of the body frame F; and includes the rear wheel WR coupled to the rear of the engine E by means of the transmission M. The powertrain unit PP is elongate in the fore-and-aft direction of the body frame F. Accordingly, height of the powertrain unit PP can be reduced to a great extent. Moreover, in the engine E, the crank chamber CC and the lubricant oil chamber CO are provided separately from each other. Accordingly, downsizing of the crankcase 24 is achieved, and in addition, a degree of freedom in disposing the lubricant oil chamber CO is increased. In such a way, the overall height of the engine E, and in particular, of the crankcase 24 thereof, can be restricted to be small, and the capacity of the storage box B provided above the engine E can be increased to a great extent. In addition, the seat height can be lowered. Furthermore, the engine E maintains a sufficient volume of the lubricating oil while restricting agitation resistance of the lubricating oil by the crankshaft 25, and performance of the powertrain unit PP is not degraded even if the overall height thereof is reduced.

Moreover, the lubricant oil chamber CO is provided along the side of the crank chamber CC. Accordingly, the agitation of the lubricating oil can be restricted while making it possible to sufficiently ensure the capacity of the lubricant oil chamber CO and to lower the crankshaft 25 downward. Furthermore, a distance between the crank chamber CC and the lubricant oil chamber CO is shortened, and a hydraulic construction between both chambers is thus simplified. As a result, a load on the hydraulic pump 80 can be reduced, and in addition, an amount of the lubricating oil can be ensured.

Furthermore, employment of the coupling link 6 for suspending the powertrain unit PP from the body frame F permits an increase in the capacity of the storage box B while ensuring an extended length of the storage box B, and improving cushion performance thereof.

Although the first object of the present invention has been addressed as described above, the present invention is not limited to the embodiment disclosed herein, and various embodiments are possible within the scope of the present invention.

For example, not only the storage box but also a fuel tank may be disposed above the crankcase, thus making it possible to ensure a desired capacity of the fuel tank.

In addressing the second object of the invention, as described above, the lubrication-oil barrier ST for preventing the lubricating oil from entering the crank chamber CC from the outside of the crankcase 24 is provided to the left and right journal bearing portions 24Lb and 24Rb. As a result, it is possible to reduce the entrance of the lubricating oil into the crank chamber CC as much as possible, and it is therefore possible to keep the crankshaft 25 from agitating the lubricating oil to the extent possible. Thus, the engine performance is improved.

In addition, the lubrication-oil barrier ST is formed of the first and second protrusion bosses 53 and 54 extending from the journal bearing portions 24Lb and 24Rb toward the crankshaft 25, or of any one of them, so that the structure thereof is simple, and machining is easy, and accordingly, inexpensive provision is enabled.

Moreover, the left and right communicating oil passages 96 and 97 provided to the journal bearing portions 24Lb and 24Rb can assist the prevention of entrance of the lubricating oil into the crank chamber CC. In addition, machining for these communicating oil passages 96 and 97 is easy, and accordingly, inexpensive provision is enabled.

Furthermore, the returning oil passage 98 returns the lubricating oil blocked by the oil seal 51 to the lubricating oil chamber CO. The returning oil passage 98 can be also used as an oil passage for returning the lubricating oil from the communicating oil passage 96 to the lubricating oil chamber CO, so that it is possible to achieve simplification of the construction of the oil passage, and accordingly, inexpensive provision is enabled.

Although the second object of the present invention has been addressed as described above, the present invention is not limited to the disclosed embodiment, and various examples are possible within the scope of the present invention.

For example, although, in the above example, description has been given of a case in which the lubrication-oil passage structure according to the present invention is implemented in a motorcycle engine, the structure can be implemented in an engine for another application. In addition, although in the above example, the protrusion bosses as the lubrication-oil entrance prevention means are the first and second protrusion bosses 53 and 54, it is possible to use only one of them. It is also possible to form the protrusion bosses with a third protrusion boss or more instead of only the first and second protrusion bosses 53 and 54.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. A motorcycle comprising a body frame, a seat mounted on the body frame, a rear wheel operatively connected to the body frame, and a storage box arranged substantially vertically below the seat in a rear portion of the body frame, the motorcycle further comprising a powertrain unit suspended from the body frame so as to be positioned under the storage box, the powertrain unit comprising an engine and a transmission, the engine comprising a cylinder arranged along a cylinder axial line which is oriented in a fore-and-aft direction of the body frame, the engine further having a crank chamber and a lubricant oil chamber formed therein and provided separately from each other, and the engine further comprising a crankcase enclosing the crank chamber, a crankshaft supported on the crankcase, and an oil pump housed within the lubricant oil chamber, wherein the oil pump is actuated by the crankshaft; and wherein an oil pan is absent from the crank chamber;

the transmission extending from a rear portion of the engine and operatively interconnecting the engine and the rear wheel, wherein the powertrain unit extends in the fore-and-aft direction of the body frame; and the lubricant oil chamber is provided alongside of and below the crank chamber.

2. The motorcycle according to claim 1, further comprising a suspension assembly for suspending the powertrain unit from the body frame, the suspension assembly comprising a coupling link for pivotally coupling an upper portion of the engine to the body frame, wherein the coupling link is disposed under the storage box.

3. The motorcycle according to claim 1, wherein the crankcase encloses the crank chamber and the lubricant oil chamber, and wherein the engine is lubricated by means of a dry sump, the dry sump comprising
the oil pump disposed within the lubricant oil chamber, and
a reed valve operable to return lubricating oil from the crank chamber to the lubricant oil chamber.

4. The motorcycle according to claim 3, wherein the lubricant oil chamber is sealed, and wherein the reed valve is opened and closed by pressure variations generated in the sealed lubricant oil chamber by operation of the engine.

5. The motorcycle according to claim 1, wherein the crankcase comprises a pair of journal bearing portions formed therein and having bearings mounted thereon, and the crankshaft which is freely rotatable supported by the bearings on the journal bearing portions, the engine further comprising a lubrication-oil passage structure disposed between the pair of journal bearing portions, and wherein the pair of journal bearing portions are provided with a lubrication-oil barrier for resisting entry of lubricating oil from outside of the crankcase into the crank chamber.

6. The motorcycle according to claim 5, wherein the lubrication-oil barrier includes a communicating oil passage provided on the journal bearing portion which permits the inside and outside of the crank chamber to communicate with each other, wherein the communicating oil passage is configured to return oil from an area between the journal bearing portion and the crankshaft to an area of the engine outside of the crank chamber.

7. The motorcycle according to claim 5, wherein at least one of the pair of journal bearing portions is provided with an oil seal which seals between one journal bearing portion and the crankshaft, a bearing being positioned between the oil seal and the crank chamber, and the oil seal positioned on the at least one of the pair of journal bearing portions on a side opposite to the crank chamber, and wherein at least one of the pair of journal bearing portions is further provided with a returning oil passage for returning lubricating oil blocked by the oil seal to the lubricating oil chamber, wherein the communicating oil passage is allowed to communicate with the returning oil passage.

8. The motorcycle according to claim 5, wherein the lubrication-oil barrier comprises a plurality of closely spaced protrusion bosses extending outwardly from the journal shaft portions, the terminal ends of the protrusion bosses abutting the crankshaft, the plurality of protrusion bosses providing a labyrinth packing function so as to resist passage of lubricating oil between the journal shaft portion and the crankshaft in the region of the plurality of protrusion bosses.

9. The motorcycle according to claim 5, wherein the lubrication-oil barrier comprises a protrusion boss extending from the journal bearing portion toward the crankshaft, wherein an end face of the protrusion boss is positioned adjacent to an outer face of the crankshaft, and is thereby configured to cover an oil leakage gap between the crankshaft and the journal bearing portion.

10. The motorcycle according to claim 9, wherein the lubrication-oil barrier includes a communicating oil passage provided on the journal bearing portion which provides fluid communication between the inside and outside of the crank chamber, wherein the communicating oil passage is configured to return lubricating oil, which has passed between the journal bearing portion and the crankshaft, to a location of the engine outside of the crank chamber.

11. A motorcycle comprising a body frame, a seat mounted on the body frame, and a storage box arranged so as to be vertically stacked with respect to the seat in a rear portion of the body frame, the motorcycle further comprising a rear wheel and a powertrain unit suspended from the body frame so as to be positioned under the storage box, the powertrain unit comprising an engine and a transmission, the engine being a dry sump engine and comprising a cylinder arranged along an axial line which is oriented in a fore-and-aft direction of the body frame, and a crankcase enclosing both a crank chamber and a lubricant oil chamber, wherein the crank chamber is provided separately from the lubricant oil chamber, the engine further comprising a crankcase enclosing the crank chamber, a crankshaft supported on the crankcase, and an oil pump housed within the lubricant oil chamber, wherein the oil pump is actuated by the crankshaft, and wherein an oil pan is absent from the crank chamber; and the transmission extending from a rear portion of the engine and operatively interconnecting the engine and the rear wheel, wherein the lubricant oil chamber is disposed below and alongside of the crank chamber.

12. The motorcycle according to claim 11, wherein the powertrain unit extends in the fore-and-aft direction of the body frame.

13. The motorcycle according to claim 11, the motorcycle comprising a suspension assembly for suspending the powertrain unit from the body frame, the suspension assembly comprising an elongate coupling link for pivotably coupling an upper portion of the engine to the body frame, wherein the coupling link is disposed under the storage box.

14. The motorcycle according to claim 11, wherein the engine is lubricated by means of a dry sump system, the dry sump system comprising the oil pump disposed within the lubricant oil chamber, and a reed valve for allowing lubricating oil from the crank chamber to return to the lubricant oil chamber, wherein the lubricant oil chamber is sealed, and wherein the reed valve is opened and closed by pressure variations generated in the sealed lubricant oil chamber by operation of the engine.

15. The motorcycle according to claim 11, wherein the engine further comprises a pair of journal bearing portions which are formed in the crankcase, a pair of crankshaft bearings mounted on the journal bearing portions, and a crankshaft which is freely rotatable supported by the crankshaft bearings, the engine further comprising a lubrication-oil passage structure extending between the journal bearing portions, and wherein the pair of journal bearing portions are provided with a lubrication-oil barrier for resisting entry of lubricating oil from outside of the crankcase into the crank chamber.

16. The motorcycle according to claim 15, wherein the lubrication-oil barrier comprises a protrusion boss extending from the journal bearing portion toward the crankshaft, wherein an end face of the protrusion boss is positioned adjacent to an outer face of the crankshaft, and is configured to substantially cover an oil leakage gap between the crankshaft and the journal bearing portion.

17. The motorcycle according to claim 15, wherein the lubrication-oil barrier includes a communicating oil passage provided on the journal bearing portion which permits the inside and outside of the crank chamber communicate with each other, wherein the communicating oil passage is configured to return oil from an area between the journal bearing portion and the crankshaft to an area of the engine outside of the crank chamber.

18. The motorcycle according to claim 15, wherein at least one of the pair of journal bearing portions is provided with an oil seal disposed between one journal bearing portion and the crankshaft, a bearing being positioned between the oil seal and the crank chamber, and the oil seal positioned on the at least one of the pair of journal bearing portions on a side opposite to the crank chamber, and wherein at least one of the pair of journal bearing portions is further provided with a returning oil passage for returning lubricating oil blocked by the oil seal to the lubricating oil chamber, wherein the communicating oil passage is allowed to communicate with the returning oil passage.

* * * * *